US006186906B1

(12) United States Patent
Sullivan et al.

(10) Patent No.: US 6,186,906 B1
(45) Date of Patent: Feb. 13, 2001

(54) GEL MATRIX GOLF BALL

(75) Inventors: Michael J. Sullivan, Chicopee; Thomas J. Kennedy, III, Wilbraham; R. Dennis Nesbitt, Westfield; Mark L. Binette, Ludlow; Michael John Tzivanis, Chicopee; John Nealon, Springfield; John T. Neill, Westfield, all of MA (US)

(73) Assignee: Spalding Sports Worldwide, Inc., Chicopee, MA (US)

( * ) Notice: Under 35 U.S.C. 154(b), the term of this patent shall be extended for 0 days.

(21) Appl. No.: 09/239,587

(22) Filed: Jan. 29, 1999

Related U.S. Application Data (60) Provisional application No. 60/116,764, filed on Jan. 22, 1999.

(51) Int. Cl.[7] ................................................. A63B 37/00
(52) U.S. Cl. .......................... 473/351; 473/371; 473/374; 473/372; 473/356; 273/DIG. 20
(58) Field of Search .................................. 473/351, 356, 473/370, 371, 374, 373; 428/215, 308.4, 424.2; 273/DIG. 20, DIG. 22

(56) References Cited

U.S. PATENT DOCUMENTS

| | | | |
|---|---|---|---|
| 3,241,834 | 3/1966 | Stingley .................................. 273/58 |
| 4,884,814 * | 12/1989 | Sullivan .......................... 273/235 R |
| 4,911,451 | 3/1990 | Sullivan et al. .................. 273/235 R |
| 4,931,376 | 6/1990 | Ikematsu et al. ..................... 526/164 |
| 5,150,906 | 9/1992 | Molitor et al. ...................... 273/220 |
| 5,397,840 | 3/1995 | Sullivan et al. ..................... 525/221 |
| 5,480,155 | 1/1996 | Molitor et al. ...................... 273/220 |
| 5,516,847 * | 5/1996 | Sullivan et al. ..................... 525/221 |
| 5,580,057 | 12/1996 | Sullivan et al. ..................... 473/377 |
| 5,593,769 * | 1/1997 | Wolf et al. ............................ 428/286 |
| 5,633,286 | 5/1997 | Chen et al. ........................... 524/474 |
| 5,654,362 | 8/1997 | Schulz et al. ........................ 524/862 |
| 5,679,734 | 10/1997 | Peccoux et al. ..................... 524/267 |
| 5,683,312 | 11/1997 | Boehm et al. ....................... 473/354 |
| 5,756,195 | 5/1998 | Allen et al. ........................ 428/313.3 |
| 5,759,676 * | 6/1998 | Cavallaro et al. ................... 428/215 |
| 5,779,561 | 7/1998 | Sullivan et al. ..................... 473/373 |
| 5,789,486 | 8/1998 | Maruoka et al. .................... 525/123 |
| 5,820,489 | 10/1998 | Sullivan et al. ..................... 473/377 |
| 5,827,133 | 10/1998 | Chang .................................. 473/370 |
| 5,827,459 | 10/1998 | Allen et al. ......................... 264/46.4 |
| 5,836,390 | 11/1998 | Apps et al. ............................. 16/281 |
| 5,984,806 * | 11/1999 | Sullivan et al. ..................... 473/373 |
| 6,001,930 * | 12/1999 | Rajagopalan ....................... 525/92 B |

* cited by examiner

*Primary Examiner*—Lee Young
*Assistant Examiner*—Minh Trinh

(57) ABSTRACT

The present invention is directed to the use of gel material in a golf ball. In one aspect of the invention discrete gel particles form an integral structural and functional role in the hard-cover, mantle or core elements of a golf ball to provide an additional ways of varying the playability properties of a golf ball. In one embodiment the invention is directed to a golf ball comprising a mantle dispersed with discrete voids filled with gel to provide a heterogeneous mixture of at least one gel material and at least one non-gel material. In another embodiment of the invention 10 parts of ground down silica gel material, 50 parts Iotek® 1002, 50 parts Iotek® 1003, and 0.025 parts UM Blue to provide a composite mantle. In this embodiment the degree of measured compression (and good guide to deformability and initial spin rate when struck by a golf club) is increased with a commitment decrease in Shore C/D hardness. In another aspect of the invention discrete elastomeric particles form an integral structural and functional role in the hard-cover, mantle or core elements of a golf ball.

7 Claims, 9 Drawing Sheets

GEL MATRIX GOLF BALL

CROSS-REFERENCE TO RELATED APPLICATIONS

This application claims benefit to Provisional application Ser. No. 60/116,764 filed Jan. 22, 1999.

BACKGROUND OF THE INVENTION

This invention relates to a golf ball composition and, more particularly, to a golf ball using a matrix composite comprising a polymer and discrete particles of gel to vary the playability of a golf ball.

As described in U.S. Pat. No. 5,779,561 golf balls traditionally have been categorized in three different groups, namely as one-piece balls, multi-piece (two or more piece) solid balls and wound balls. Conventional multi-piece solid golf balls include a uniform or multi-layer solid resilient core having a cover of a different type of material molded thereon. Wound golf balls traditionally have included a liquid or solid center, elastomeric winding around the center, and a molded cover. Solid cores often are made of polybutadiene and the molded covers generally are made of natural balata, synthetic balata, ionomeric resins, crosslinked polyurethane, or thermoplastic polyurethane. A great deal of research continues in order to develop golf balls exhibiting the desired combination of carrying distance, durability (e.g. cut and abrasion resistance, and fatigue endurance), and spin.

U.S. Pat. No. 5,150,906 describes a golf ball comprising a hollow, spherical shell of a deformable polymeric material that is filled with either a liquid or a unitary, non-cellular core of a material having a central non-wound core, an inner and an outer layer. The core material may be added through a hole in the shell as a liquid, a gel or a melt.

U.S. Pat. No. 5,397,840 describes a golf ball cover comprising a non-ionic/ionic copolymer blend. A golf ball with the ionic/ionic copolymer blend exhibits no loss in coefficient of restitution (C.O.R.), and has equal resistance to cutting and cracking when compared to top grade golf ball covers made with one of the conventional 100% ionic copolymer blends.

A coated golf ball comprising a golf ball body and a paint layer is described in U.S. Pat. No. 5,789,486. The paint layer is comprised of a dispersion of internally-crosslinked polymer gel fine particles. The coated golf ball is claimed to have excellent coating characteristics including less sagging of the paint coat at the dimple edge, and maintenance of original flying characteristics.

A golf ball having a reduced spin rate is described in U.S. Pat. No. 5,827,133. In one embodiment of the invention, the golf ball is constructed with a fluid core either of a liquid or gelatinous substance. Such a construction is believed to render the golf ball less responsive to any initial spin imparted to the outer cover of the golf ball.

U.S. Pat. No. 5,820,489 describes a low spin golf ball comprising a core that further comprises a diene polymer having a Riehle compression of at least 0.075; and a cover having a Shore D hardness of at least 65. U.S. Pat. No. 5,580,057 also describes a low spin golf ball comprising a soft core and a hard cover to produce a resulting molded golf ball having a reduced spin rate.

U.S. Pat. No. 5,779,561 describes a multi-layer golf ball with a central core, an inner cover layer containing a non-ionomeric polyolefin material and a filler, and an outer cover layer comprising a resin composition. While the inner cover layer contains a non-ionomeric material, the outer cover layer may include an ionomer. The golf ball can be configured to have playability properties comparable to those of golf balls that contain higher quantities of ionomer. The core may be wound or non-wound, and include liquid, gel or solid cores.

Iononomeric resins are polymers containing interchain ionic bonding. Examples of ionomeric resins used for the construction of golf ball covers include those sold by E. I. DuPont de Nemours & Company, Wilmington, Del. ("DuPont") under the registered trademark "Surlyn" and by Exxon Corporation, Irving, Tex. (see U.S. Pat. Nos. 5,779,561 and 4,911,451; U.S. Pat. Nos. 5,779,561 and 4,911,451 are hereby incorporated by reference in their entirety) under the registered trademarks "Escor" and the trade name "Iotek." Ionomeric resins have become the materials of choice for the construction of golf ball covers over the traditional balata (trans-polyisoprene, natural or synthetic) rubbers. The softer balata covers, although exhibiting good playability properties, lack the durability required for repetitive play.

While there are numerous commercial grades of ionomers available, the properties vary according to the type and amount of metal cations, molecular weight, composition of the base resin (i.e., relative content of ethylene and methacrylic and/or acrylic acid groups) and additive ingredients such as reinforcement agents, etc. Consequently there is a need for a composite structure wherein the playability properties are varied according to a set of parameters separate from and in addition to the molecular properties of the non-gel material (e.g. an ionomeric polymer.) More particularly there is a need for a composite material comprising of a non-gel material dispersed with discrete particles of gel to provide at least one continuous phase and at least one discontinuous phase. Such a composite structure will enjoy playability properties that additionally vary in accordance with the type of gel particles dispersed in the non-gel material.

A gelatinous elastomer composition is described in U.S. Pat. No. 5,633,286: that patent is hereby incorporated by reference in its entirety. The gelatinous elastomer composition is physically interlocked with an open cell sponge thereby displacing the air space within the sponge. Gel rigidity is found to be greater than the sum of the combined rigidity of the gelatinous elastomer composition and sponge alone. The gelatinous elastomer composite exhibited high elongation and tensile strength and excellent shape retention after extreme deformation under high-velocity impact and stress conditions.

While the prior art teaches various golf ball compositions, none of the prior art teaches a golf ball with a mantle, hard-cover layer or core comprising of discrete voids filled with a gel in order to alter the playability of the golf ball. In addition, none of the prior art teaches a non-wound golf ball with a solid core dispersed with discrete voids filled with a gel. More particularly, none of the prior art teaches a non-wound golf ball comprising a solid core comprising of discrete voids filled with gel and with good control and spin off the club similar to a more expensive wound golf ball.

BRIEF DESCRIPTION OF THE DRAWINGS

The following is a brief description of the drawings which are presented for the purposes of illustrating the invention and not for purposes of limiting the same.

BRIEF SUMMARY OF THE INVENTION

Accordingly, an object of this invention is to provide a golf ball composition with a mantle, cover, core, or entire ball comprising discrete particles of gel.

Another object is to provide a non-wound golf ball comprising a solid core comprising discrete voids filled with gel.

Yet another object is to provide a composite golf ball with an advantageous combination of the properties of deformability, spin, carrying distance, durability, bite and good control off the club.

A more particular object is to provide a golf ball comprising a layer of composite ionomer comprising voids filled with a gel, discrete particles of gel material, or discrete particles of elastomeric material.

For the purposes of the rest of this description, a non-gel material is defined as a continuous phase of material. The heterogeneous mixture is thus a continuous phase dispersed with at least one discontinuous phase of discrete particles of gel material. The discrete particles provide the discontinuous phase, which for the purposes of this description is equivalent to the gel material. Put another way the gel material defines at least part of the discontinuous phase and the at least one non-gel material defines at least part of the continuous phase.

In one embodiment of the present invention, a golf ball comprises a mantle layer, wherein the mantle layer comprises a heterogeneous mixture of at least one non-gel material and at least one gel material.

In another embodiment of the present invention, a golf ball comprises a core wherein the core comprises a heterogeneous mixture of at least one non-gel material and at least one gel material.

In another embodiment of the present invention, a golf ball comprises a cover layer wherein the cover layer comprises a heterogeneous mixture of at least one non-gel material and at least one gel material.

In yet another embodiment of this invention a golf ball composition is provided with a mantle, cover, core, or entire ball which comprises a heterogeneous mixture of at least one non-gel material and at least one gel material.

In another aspect of the invention the heterogeneous mixture comprises a continuous phase of hard gel material dispersed with a non-continuous phase of softer gel material.

Examples of suitable gel material include ground polyether block amides, ground polyester elastomer, ground rubber, latex gel, ground polyurethane, plasticized vinyl, ground plastomer, poly vinyl alcohol, cross-linked polybutadiene particles, silica gel, production RG, polystyrene gels, polyacrylic acid gel, agar, cross-linked silicone, starch gel, polysaccharide polymer gel, water gelatin gel, hydrogel, and water/methyl cellulose gel, copolymer rubber based material, and viscoelastic gel.

DETAILED DESCRIPTION OF THE INVENTION

For the purposes of this patent, the term "gel" is any substance with a Jar-Test Gel State Code (JTGSC) of at least 1 and not greater than 11 as defined in Table 1 in U.S. Pat. No. 5,836,390, that patent is hereby incorporated by reference in its entirety. The Jar-Test Gel State Codes are based on the work of Sydansk (1990): that patent is hereby incorporated by reference in its entirety; see Table 4:

TABLE 4

Jar-Test Gel State Codes Modified from Sydansk (1990)

1. No detectable gel formed. The gel appears to have the same viscosity (fluidity) as the original polymer solution and no gel is visually detectable.
2. Highly flowing gel. The gel appears to be only slightly more viscous than the initial polymer solution.
3. Flowing gel. Most of the obviously detectable gel flows to the bottle cap upon inversion.
4. Moderately flowing gel. A small portion (about 5 to 15%) of the gel does not readily flow to the bottle cap upon inversion- usually characterized as a tonguing gel (i.e., after hanging out of the bottle, gel can be made to flow back into the bottle by slowly turning the bottle upright).
5. Barely flowing gel. The gel slowly flows to the bottle cap and/or a significant portion (>15%) of the gel does not flow upon inversion.
6. Highly deformable nonflowing gel. The gel does not flow to the bottle cap upon inversion (gel flows to just short of reaching the bottle cap).
7. Moderately deformable nonflowing gel. The gel flows about halfway down the bottle upon inversion.
8. Slightly deformable nonflowing gel. Only the gel surface deforms slightly upon inversion.
9. Rigid gel. There is no gel-surface deformation upon inversion.
10. Ringing rigid gel. A tuning-fork-like mechanical vibration can be felt or a tone can be heard after the bottle is tapped.

TABLE 4-continued

Jar-Test Gel State Codes Modified from Sydansk (1990)

11. Rigid gel no longer ringing. No tone or
vibration can he felt or heard, because natural
frequency of the gel has increased.

The term "gel" as used herein includes a colloid in which a disperse phase is combined with a continuous phase, having a JTGSC of at least 1 and not greater than 11. The term "gel" as used herein also includes elastically deformable material such as gelatinous elastomers as described in U.S. Pat. No. 5,633,286. That patent is hereby incorporated by reference in its entirety.

Suitable gels and elastomeric materials useful in the invention include ground PEBAX® (polyether block amides, sold by Atochem, Puteaux (Hants de-Seine) France), ground HYTREL® (polyester elastomer sold by DuPont), ground rubber (tire-scrap, non-black, soft), latex gels, ground polyurethane (thermoset, thermoplastic), highly plasticized vinyl, ground plastomers, poly vinyl alcohol, ground superball (a mixture of polybutadiene, a vulcanizing agent and a polybutadiene reinforcing agent essentially as described in U.S. Pat. No. 3,241,834), DECOSOFT® cross-linked polybutadiene particles sold by CU Chemie Uetikon AG Uetikon am See, Switzerland, silica gels, polystyrene gels, polyacrylic acid gel "super absorbers," agar, cross-linked silicone, and starch gels.

Examples of other suitable gels include polysaccharide polymer gel, water gelatin gels, hydrogels, and water/methyl cellulose gels as described in U.S. Pat. No. 5,480,155: that patent is hereby incorporated by reference in its entirety. Additional examples of suitable gels include gels comprised of copolymer rubber based materials such a styrene-butadiene-styrene rubber and paraffinic and/or naphthenic oil as described in U.S. Pat. No. 5,683,312: that patent is hereby incorporated by reference in its entirety.

Still other examples of suitable gels include viscoelastic gels as described in U.S. Pat. No. 5,827,459: that patent is hereby incorporated by reference in its entirety. For example, a viscoelastic gel based on butadiene style rubber prepared from an oil, such as Kaydol® (heavy white mineral oil sold by Witco Corp, New York City, N.Y.), and poly-isobutadiene as described in U.S. Pat. Nos. 5,756,195 and 5,827,459; both patents are hereby incorporated by reference in their entirety. For example, a suitable viscoelastic gel comprises Kaydol® and a styrene ethylene butadiene styrene triblock medium rubber polymer such as Kraton® 1650 M (sold by Shell Oil Co., Houston, Tex.) Increasing the percentage of Kraton in the gel composition increases the firmness of the gel. The firmness of the gel can be increased for various locations in a golf ball where a firmer gel is desired. For example, voids in the hard-cover layer that are filled with a firm viscoelastic gel in order to obtain desirable deformation and spin off the golf club while maintaining a favorable COR value.

Still other examples of suitable gels include silicone compositions which can be crosslinked into an adhesive gel by hydrosilylation at room temperature as described in U.S. Pat. No. 5,679,734 (hereby incorporated by reference in its entirety), and silicone gels that are made by reacting a ≡Si—H containing polysiloxane with an alpha, omega-diene as described in U.S. Pat. No. 5,654,362 (hereby incorporated by reference in its entirety.)

Figure 1:
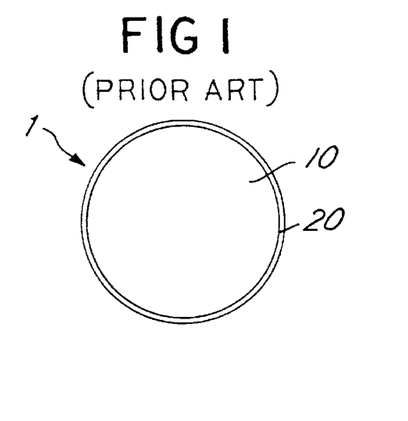
FIG. 1 shows a schematic cross-section of a single-piece golf ball known in the prior art.

Referring to FIG. 1, a cross-section of a single piece golf ball 1 according to the prior art is shown. A coating or paint layer 20 surrounds a core 10.

Figure 2:
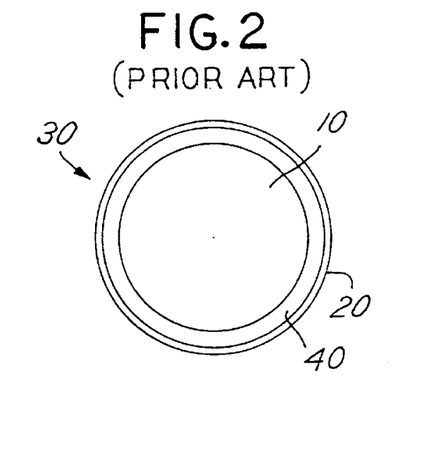
FIG. 2 shows a schematic cross-section of a two-piece golf ball known in the prior art.

Referring to FIG. 2, a cross-section of a two piece golf ball 30 according to the prior art is shown. A coating layer 20 surrounds a hard cover layer 40 that in turn surrounds a core 10.

Figure 3:
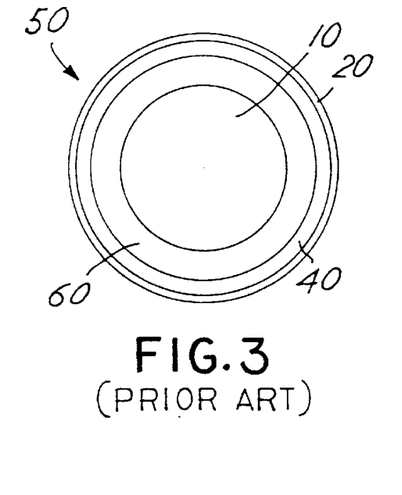
FIG. 3 shows a schematic cross-section of a three-piece golf ball known in the prior art.

Referring to FIG. 3, a cross-section of a three-piece golf ball 50 according to the prior art is shown. A coating layer 20 surrounds a hard cover layer 40 that in turn surrounds a mantle layer 60 that in turn surrounds a core 10.

Figure 4:
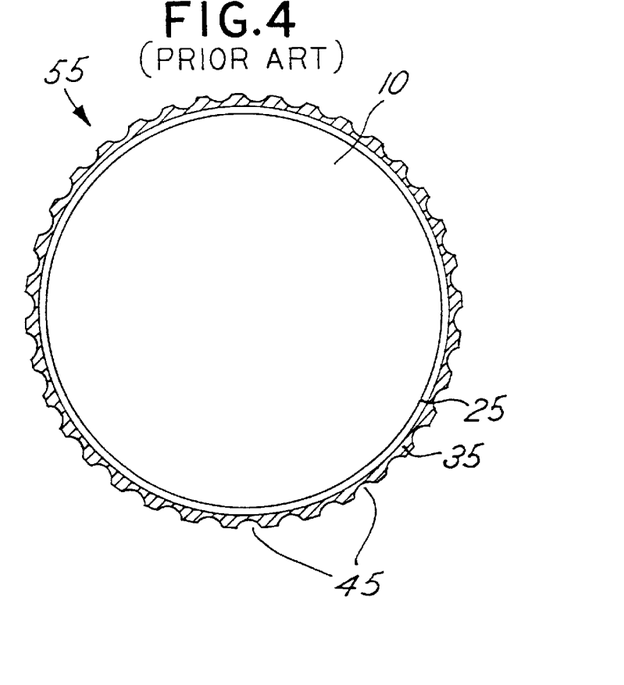
FIG. 4 shows a schematic cross-section of a golf ball with dimples known in the prior art.

Referring to FIG. 4, a cross-section of a golf ball 55 according to the prior art (i.e. U.S. Pat. No. 5,779,561) is shown. The golf ball 55 includes a central core 10 and a cover that further comprises an inner cover layer 25, and an outer cover layer 35. Dimples 45 are formed in the outer surface of the outer cover layer 35.

Figure 5:
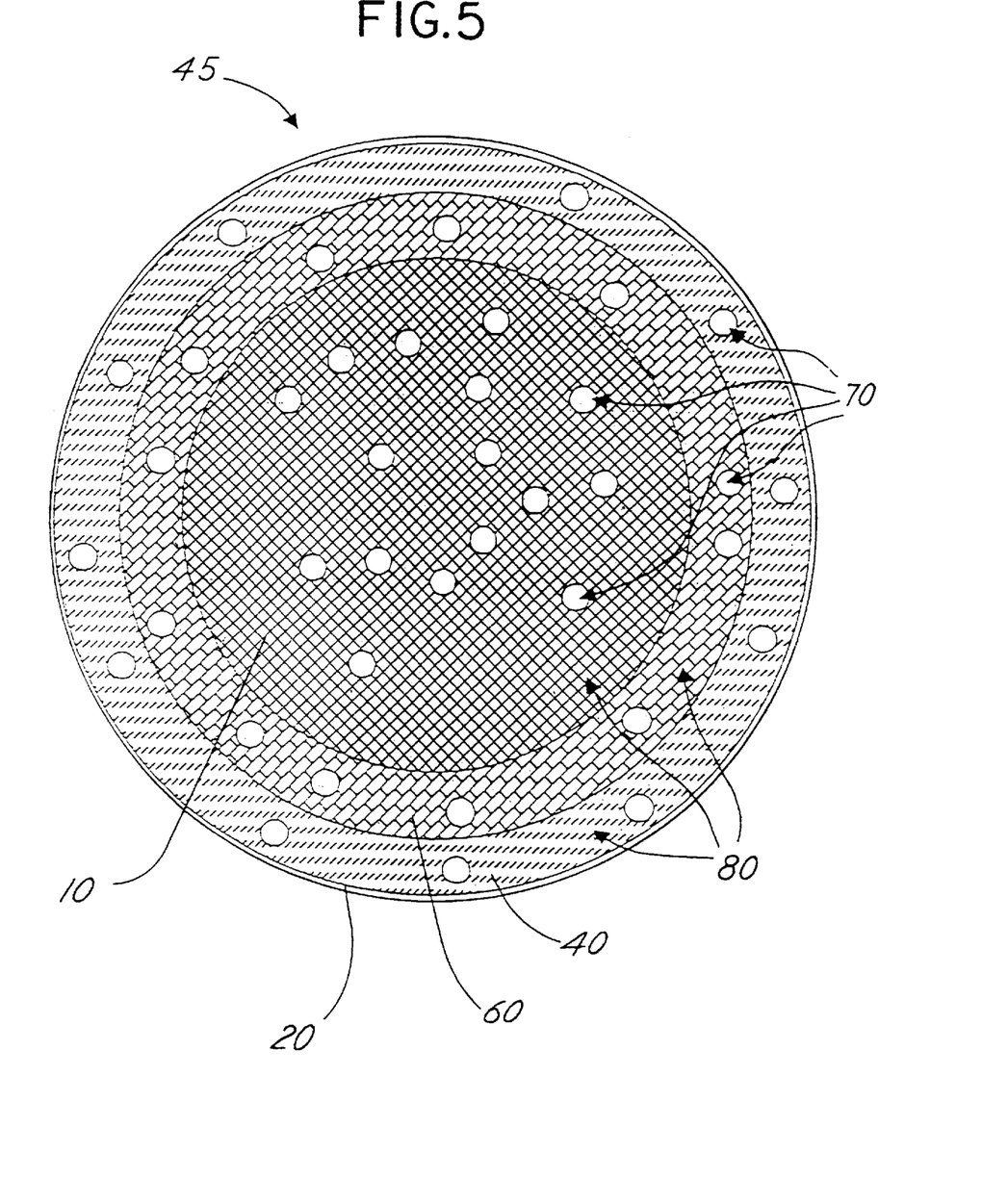
FIG. 5 is a schematic cross-section of a golf ball according to one aspect of the invention.

Referring to FIG. 5, a multilayer golf ball 45 according to one aspect of the invention is shown comprising of a plurality of discrete ground gel particles 70 located in a non-gel material 80 to provide a heterogeneous mixture. Hence the non-gel material can be defined as a continuous phase of material. The heterogeneous mixture is thus a continuous phase dispersed with at least one discontinuous phase of discrete particles of gel material with a JTGSC of at least 1 and not greater than 11. The discrete particles provide the discontinuous phase.

In one embodiment of the invention the heterogeneous mixture may comprise a continuous phase of hard gel and a discontinuous phase provided by a dispersion of discrete particles of softer gel material. A continuous phase of gel material with a JTGSC of 9 and a discontinuous phase of discrete particles comprising at least one gel material with a JTGSC of about 5 would represent one embodiment of the present invention. Thus, in a further aspect of the invention a golf ball comprising a heterogeneous mixture of a continuous phase of hard gel material is dispersed with a non-continuous phase of softer gel material, the hard gel material has a JTGSC greater than that of the softer gel material.

In one aspect of the invention as disclosed in FIG. 5, the core 10 comprises of a non-gel material 80 combined with a plurality of discrete ground gel particles 70. Likewise, the mantle layer 60 comprises of a non-gel material 80 combined with a plurality of discrete ground gel particles 70 and the hard cover layer 40 comprises of a non-gel material 80 combined with a plurality of discrete ground gel particles 70. For example, a continuous phase comprising Spalding Hyper-Elastic™ cover material with a discontinuous phase of discrete particles of silica gel (e.g. ground silica gel) would provide a suitable heterogeneous mixture combining the playability properties of Hyper-Elastic® and silica gel. In this example, the continuous phase of Hyper-Elastic™ provides the non-gel material of the heterogeneous mixture.

Alternatively, in the present invention any combination of these elements may include a plurality of discrete ground gel particles 70. Applying this principle to the golf ball shown in FIG. 1, the golf ball would comprise of a matrix of core material combined with a dispersion of discrete gel particles 70. The golf ball in FIG. 2 would comprise of a core 10 and/or mantle layer 60 that is dispersed with discrete particles of gel 70. The golf ball in FIG. 3 would comprise of a core 10 and/or mantle layer 60 and/or hard cover layer 40 dispersed with discrete particles of gel 70. Table 2 discloses a non-gel material formulation ("Mantle A") and Table 1 provides a core formulation.

Figure 6A:
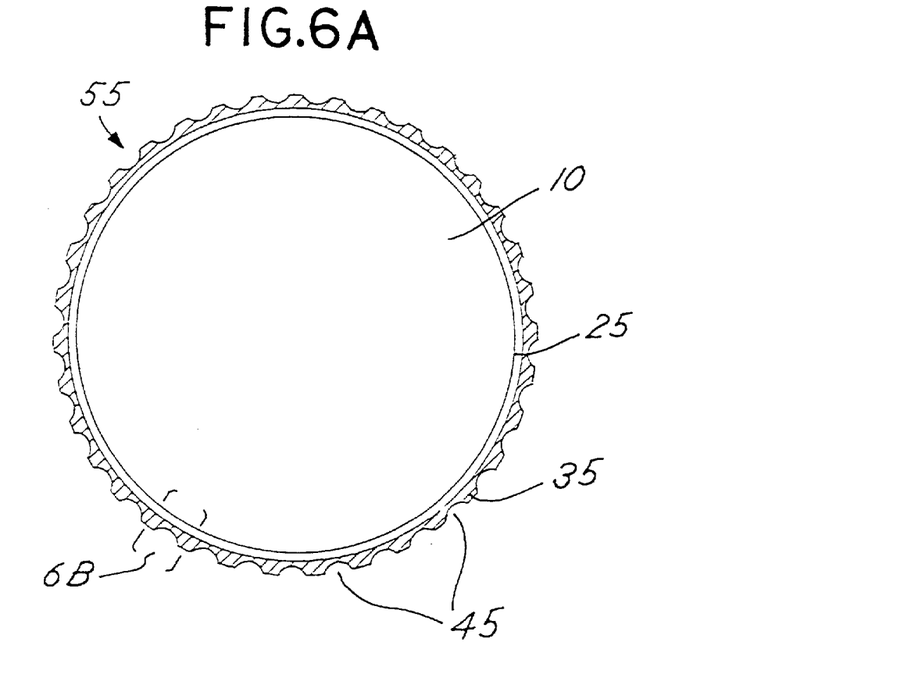
FIGS. 6A, 6B is a schematic cross-section of a golf ball according to another aspect of the invention.
Figure 6B:
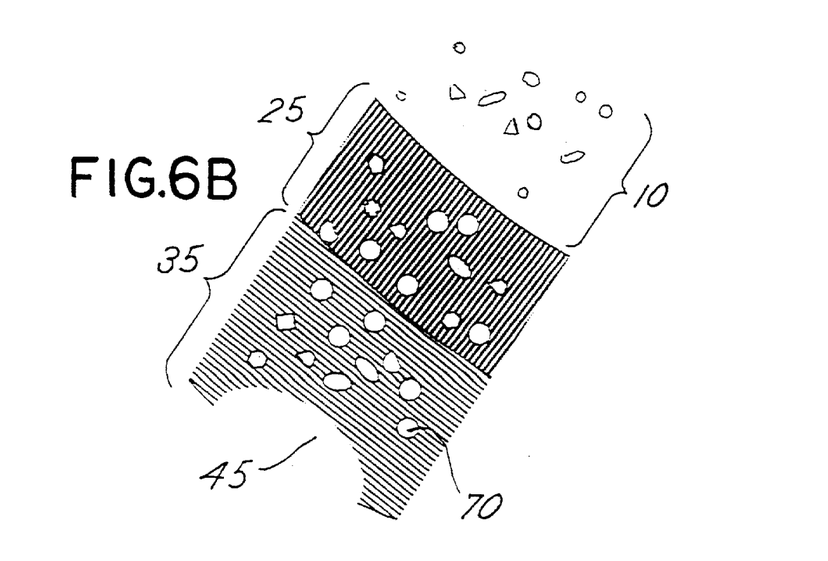

Further, applying the embodiment of the present invention as disclosed in FIG. 5 to the prior art golf ball shown in FIG. 4 would result in a composite golf ball wherein the core 10, inner cover layer 25, or the outer cover layer 35 would comprise of a non-gel material combined with a plurality of discrete gel particles to form a heterogeneous mixture as disclosed in FIGS. 6A, 6B.

The novelty of the present invention is combining non-gel materials, including those well known in the art, with gel material to provide a composite core, mantle layer or hard cover layer as disclosed, for example, in FIG. 5. In addition, the non-gel material and discrete gel particles may be juxta positioned. For example, the ground gel particles in FIGS. 7A, 7B may be juxta positioned with the non-gel material to provide a composite structure largely comprising of gel material dispersed with in the non-gel material. Likewise the gel material in FIGS. 8, 9A, 9B, 10 and 11 may be juxta positioned with the non-gel material to provide a composite structure largely comprising of gel material dispersed with in the non-gel material. While ground gel particles of roughly uniform shape are preferred, discrete particles of elastomeric scraps or discrete gel particles may also be used such as tire-scrap 140 as disclosed in FIG. 11 and Table 2.

Figure 7A:
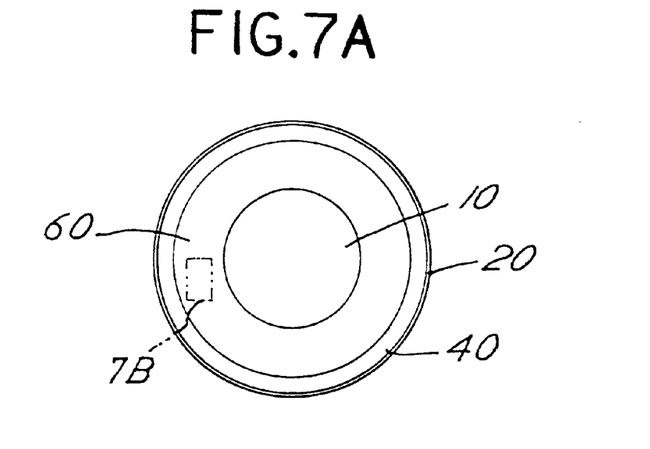
FIGS. 7A, 7B is a schematic cross-section of a golf ball according to one aspect of the invention.
Figure 7B:
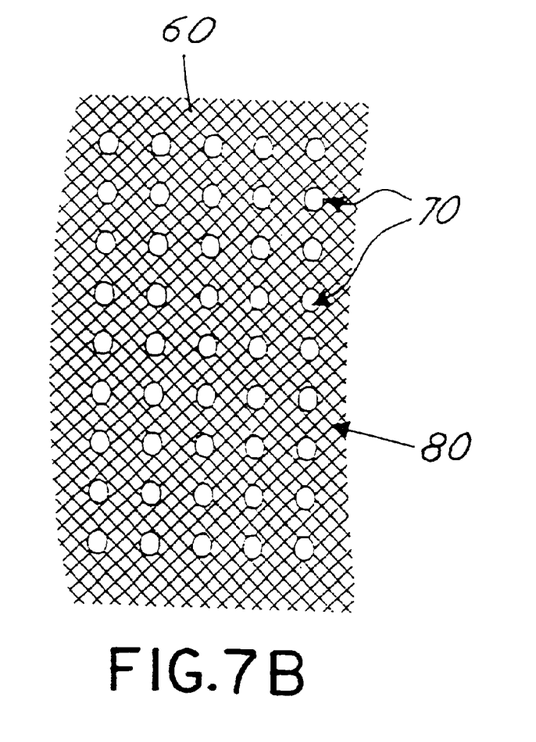
Figure 14A:
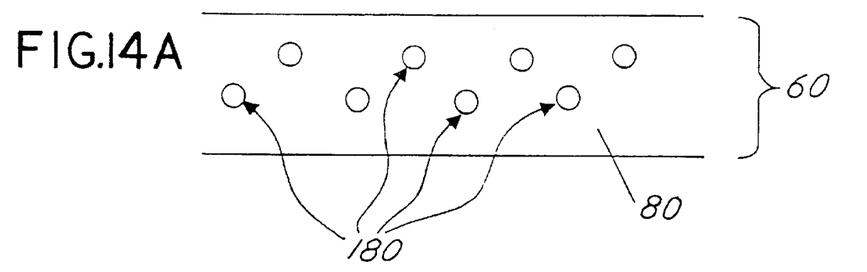
FIGS. 14A, 14B is a schematic depicting a mantle layer according to two further aspects of the invention.
Figure 14B:
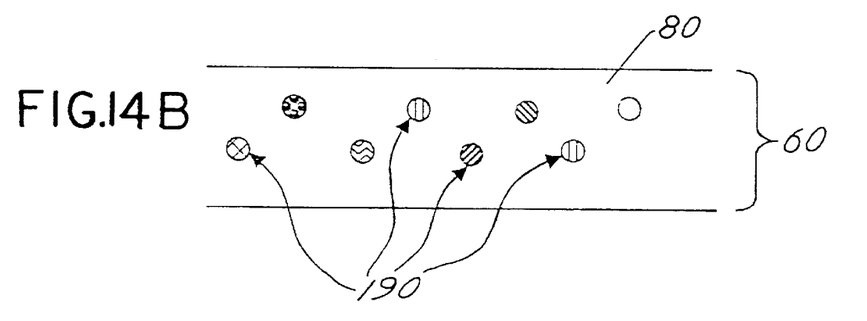
Figure 15A:
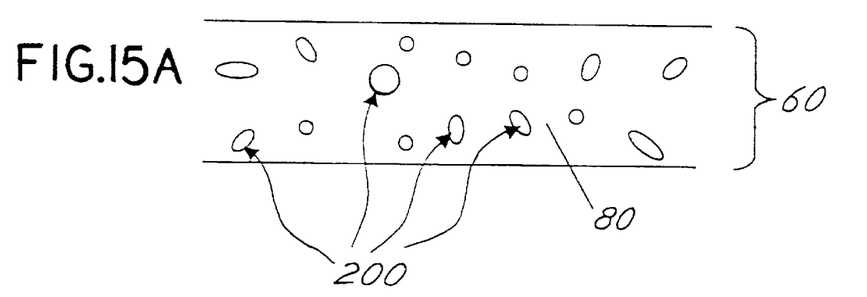
FIGS. 15A, 15B is a schematic depicting a mantle layer according to two further aspects of the invention.
Figure 15B:
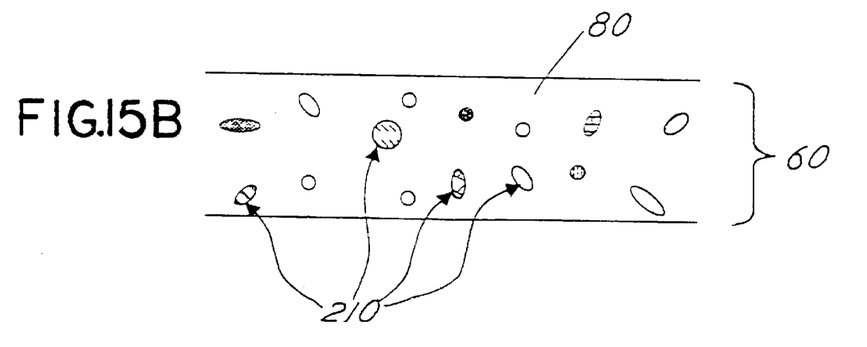

Referring to FIGS. 7A, 7B, a mantle layer comprising of a uniform distribution of discrete particles of ground gel 70 is disclosed. FIGS. 14A, 14B further discloses that the discrete gel particles may further comprise uniformly shaped gel particles comprising the same type of gel material 180 and uniformly shaped gel particles comprising different types of gel material 190. FIGS. 15A, 15B further discloses that the discrete particles of gel may further comprise variable shaped gel particles comprising the same type of gel material 200 and variable shaped gel particles comprising different types of gel material 210. The discrete particles of gel may also be distributed randomly in the mantle layer as disclosed in FIG. 11. Though not shown in these figures, the discrete particles of gel in the core 10 or hard cover layer 40 may be distributed in a random or uniform fashion, comprise of uniform or variable shapes, and further comprise of uniform or different types of gel material. In addition, the non-gel material and gel-material may be juxta positioned in the core 10, mantle layer 60, and the hard cover layer 40.

In one embodiment, the composite mantle layer comprises 10 parts of ground down silica gel material, 50 parts Iotek® 1002, 50 parts Iotek® 1003, and 0.025 parts UM Blue to provide a composite mantle layer (Iotek® 1002 and Iotek® 1003 are ionomeric resins well known in the art.)

In another embodiment, the mantle layer may comprise of a highly deformable non-flowing superball rubber and discrete particles of rigid gel material with a Jar-Test Gel State Code (JTGSC) of at least 9. In this embodiment the deformability of for example superball rubber is modified by the discrete particles of rigid gel material (suitable superball formulations are provided in Table2.) Alternatively, gels with a JTGSC of less than 9, and gels with a JTGSC of less than 5, may be used in combination with superball rubber (or other material such as tire scrap) to obtain a composite material with varied playability properties if used in the core 10, hard cover layer 40, mantle layer 60 or any combination of these.

Figure 9A:
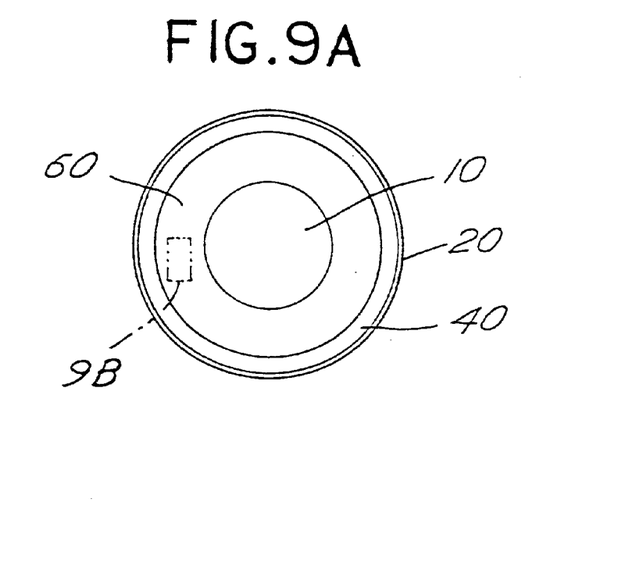
FIGS. 9A, 9B is a schematic cross-section of a golf ball according to another aspect of the invention.
Figure 9B:
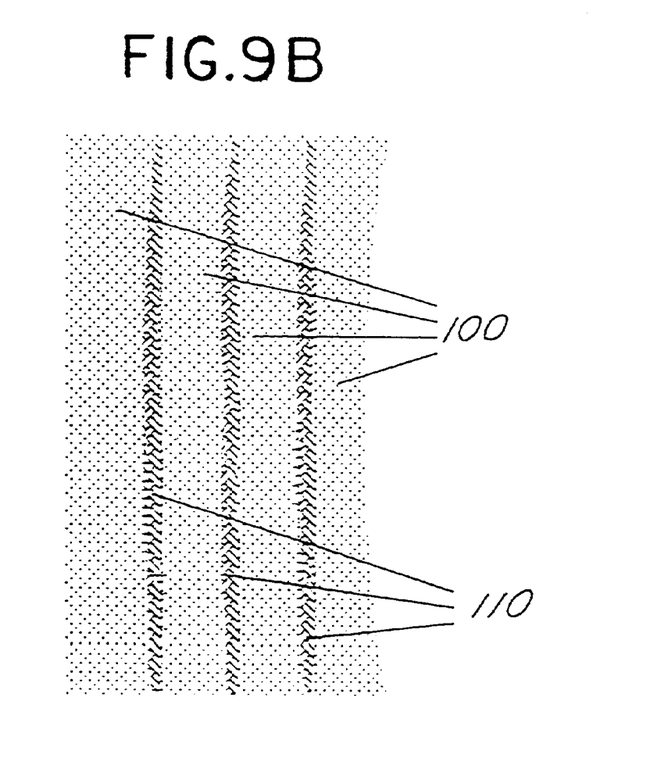

Referring to FIGS. 9A, 9B, a multi-piece golf ball is shown with an enlarged sketch of a mantle layer according to one embodiment of the invention. The mantle layer comprises of layers of non-gel material 100 separated by continuous layers of gel material 110. A liquid, lubricant, or gas may optionally replace the layers of gel. Alternatively the layers of gel may further comprise of a liquid, gas or lubricant. It is believed that a mantle layer composed of layers of non-gel material separated by gel layers will impact on the deformability and spin characteristics of the golf ball. For example, in one embodiment of the present invention, the continuous gel layers comprise of a viscous gel with a JTGSC in the range between 6 and 8. In this range the gel material is non-flowing and deformable and thus able to transmit a spin across the continuous layers of gel to the core. In contrast, continuous gel layers comprised of a highly fluid gel with a JTGSC in the range between 1 and 3 would tend to dampen any spin imparted on the golf ball off the club head.

Figure 10:
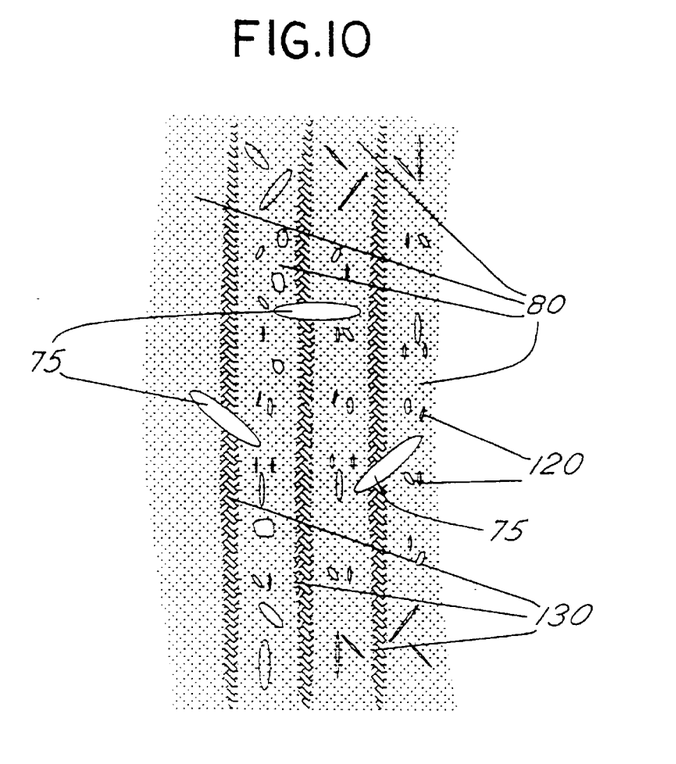
FIG. 10 is a fragmentary schematic cross-section of a composite mantle layer according to another embodiment of the invention.
Figure 11:
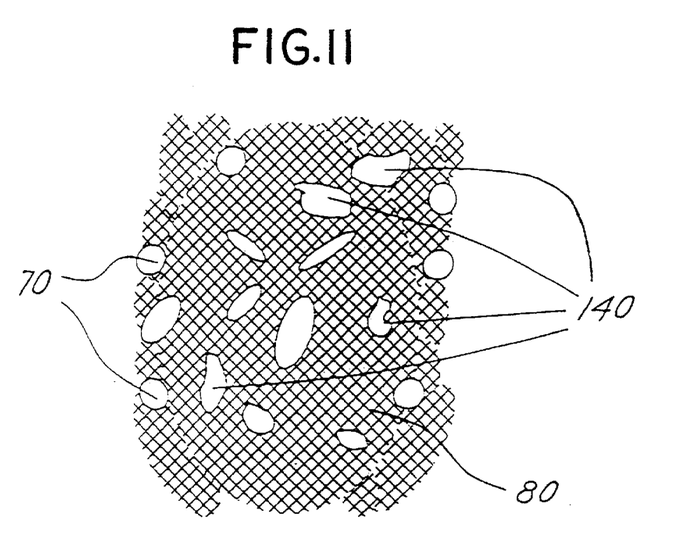
FIG. 11 is a fragmentary schematic cross-section of a composite mantle layer according to another embodiment of the invention.

The continuous gel layers may be converted to quasi-continuous gel layers or discontinuous gel layers as disclosed in FIG. 10. Discrete non-gel particles and rigid gel particles 75 abut the continuous layers to form discontinuous layers of gel material. For example, discrete particles of superball material may abut the otherwise continuous layers of silica gel to produce a composite structure that would be expected to combine the playability properties of the non-gel layers (e.g. ionomeric resin), the abutted gel layers, and the abutting discrete superball particles.

Figure 8A:
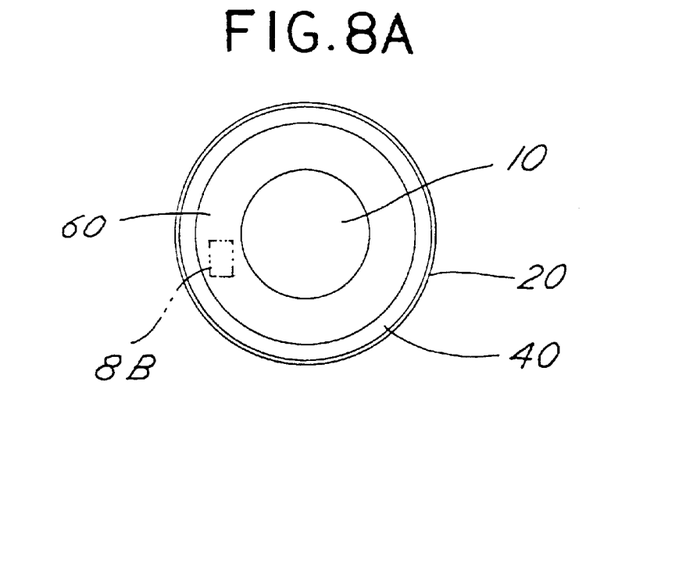
FIGS. 8A, 8B is a schematic cross-section of a golf ball according to another aspect of the invention.
Figure 8B:
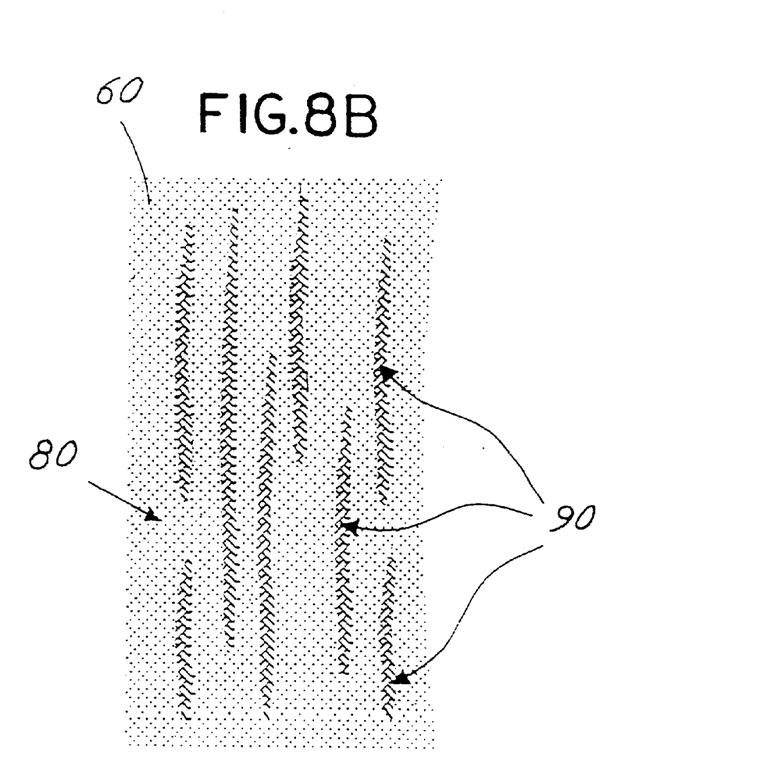
Figure 12:
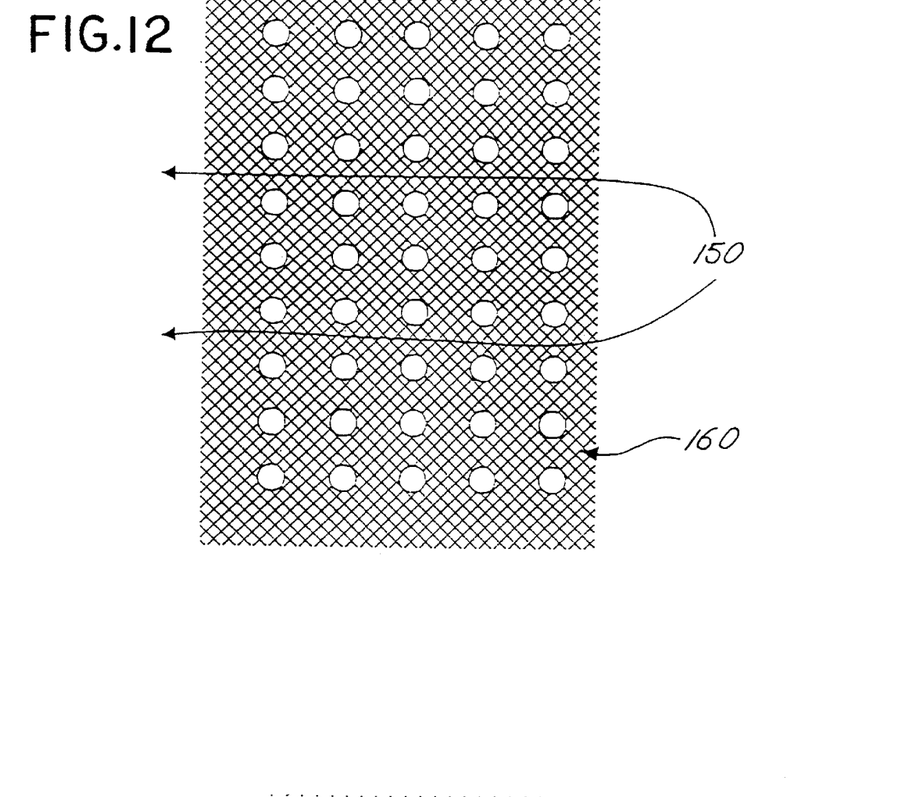
FIG. 12 is a fragmentary schematic cross-section of a composite mantle layer according to another embodiment of the invention.
Figure 13:
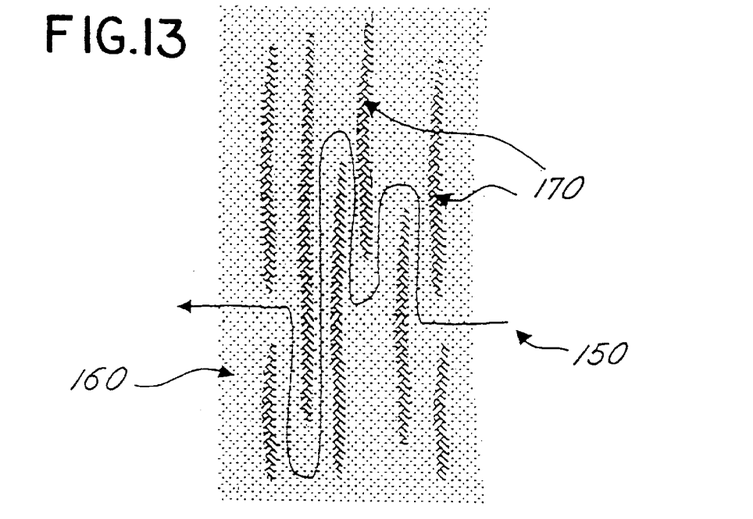
FIG. 13 is a fragmentary schematic cross-section of a composite mantle layer according to another embodiment of the invention.

By "continuous layer of non-gel material dispersed with voids" we mean a layer of non-gel material in which it is possible to trace a path without having to travel through a void filled with gel material as depicted in FIGS. 12 and 13. The voids may be filled with a gel. Alternatively, the voids may be filled with liquid, lubricant or air. The voids may be of any shape and may be elongated to give the appearance of discontinuous gel layers as shown in FIG. 8. It is understood that the term "voids filled with gel" refers to a composite structure of non-gel material with, for example, discrete particles of ground gel such as silica gel. Thus, the voids filled with gel arise when discrete particles of gel are mixed with the non-gel material (see mantle D formulation in Table 2.)

The shape or type of discrete gel particles is not believed to be critical to the invention though ground gel particles are favored due to the ease of their manufacture. For example, FIGS. 5, 8, 9A, 9B, 10, 11, 12 and 13 disclose various regular and irregular shapes, types of gel material, and various distribution patterns including uniform and irregular distribution patterns. While, for example, FIGS. 12 and 13 disclose various shapes, sizes, distribution, and types of gel particles that are used in the mantle layer of a composite golf ball, the principle also applies to the core and/or hard-covering layer. In addition, the gel material of the core, mantle layer or hard cover layer may further comprise of a liquid, lubricant, or a gas.

The following examples represent specific but nonlimiting embodiments of the present invention.

EXAMPLE 1

Core and Gel Mantle Formulations

Table 1 lists the formulation of the core and Table 2 illustrates the formulations of the sample mantle composites used in Example 2.

TABLE 1

| Material | S.G. | Parts |
|---|---|---|
| Cariflex ® BR-1220 | 0.91 | 70.00 |
| Taktene ® | 0.91 | 30.00 |
| Zinc Oxide | 5.57 | 25.50 |
| Tg Regrind | 1.18 | 0.00 |
| Zinc Stearate | 1.09 | 16.00 |

TABLE 1-continued

| Material | S.G. | Parts |
|---|---|---|
| ZDA | 2.1 | 24.80 |
| Red 100-100A | 1.5 | 0.05 |
| 29/40 or 231 XL | 1.4 | 0.90 |
| Totals | 1.181 | 167.25 |

Cariflex is a trademark of Shell Oil Company for synthetic rubber. Taktene® is a trademark of Bayer AG, Leverkusen-Bayerwerk, Germany for synthetic rubber. 29/40 or 231 XL are peroxide curing agents.

TABLE 2

Gel Mantle Formulations

| | Materials | Parts |
|---|---|---|
| Mantle A | lotek 1002 | 50 |
| | lotek 1003 | 50 |
| Mantle B | lotek 1002 | 50 |
| | lotek 1003 | 50 |
| | Ground Silicone*1 (Shore OO of 59) | 10 |
| | UM Blue | 0.025 |
| Mantle C | lotek 1002 | 50 |
| | lotek 1003 | 50 |
| | Ground Superball*2 | 10 |
| | UM Pink | 0.05 |
| Mantle D | lotek 1002 | 50 |
| | lotek 1003 | 50 |
| | Silica Gel | 10 |
| | UM Violet | 0.029 |
| Mantle E | lotek 1002 | 50 |
| | lotek 1003 | 50 |
| | Production RG*3 | 10 |
| Mantle F | lotek 1002 | 50 |
| | lotek 1003 | 50 |
| | Glass Flake*4 | 2 |
| Mantle G | lotek 1002 | 50 |
| | lotek 1003 | 50 |
| | Agar | 2.5 |
| Mantle H | lotek 1002 | 50 |

TABLE 2-continued

Gel Mantle Formulations

| | Materials | Parts |
|---|---|---|
| | lotek 1003 | 50 |
| | Knox Gelatin | 1.25 |
| Mantle I | lotek 1002 | 50 |
| | lotek 1003 | 50 |
| | Ground Superball*5 | 10 |
| Mantle J | lotek 1002 | 50 |
| | lotek 1003 | 50 |
| | Ground Superball*5 | 30 |
| Mantle K | lotek 1002 | 50 |
| | lotek 1003 | 50 |
| | Production RG*3 | 30 |

*1> Shinetsu Two part Silicone X-832-071-1 (very soft)
*2> Ground Superball Formulation Carifiex® BR-1220, 100 parts, (very soft), 231 XL peroxide 2 parts
*3> Unicore regrind, 20 mesh or smaller
*4> RCF-160 Class Flake from NGF Canada Limited
*5> Ground Superball Formulation Carifiex® BR-1220,100 parts, (very soft), 231 XL peroxide 2 parts, Black Color MB 1 part

EXAMPLE 2

The formulations listed in Tables 1 and 2 were analyzed for compression ("Comp"), COR, and Shore C/D values. The findings are reported in Table 3.

The meaning of such terms as compression (Comp), COR (coefficient of restitution), Shore C/D are well known in the art and are defined, for example, in U.S. Pat. Nos. 5,580,057 (hereby incorporated by reference in its entirety) and 5,820,489 (hereby incorporated by reference in its entirety.)

TABLE 3

| Sample # | Mantle Material | Core Data Size | Weight | Comp | COR | Mantle Data Size | Weight | Comp | COR | Shore C/D |
|---|---|---|---|---|---|---|---|---|---|---|
| 1 | A | 1.47" | 32.6 | 99 | 778 | 1.575 | 38.6 | 84 | 803 | 96/68 |
| 2 | B | 1.47" | 32.6 | 99 | 778 | 1.576 | 38.3 | 87 | 798 | 94/62 |
| 3 | C | 1.47" | 32.6 | 99 | 778 | 1.58 | 38.4 | 85 | 800 | 94/64 |
| 4 | D | 1.47" | 32.6 | 99 | 778 | 1.575 | 38.4 | 83 | 800 | 96/69 |
| 5 | A | 1.47" | 32.1 | 107 | 752 | 1.578 | 38.1 | 86 | 787 | 96/68 |
| 6 | B | 1.47" | 32.1 | 107 | 752 | 1.578 | 37.9 | 89 | 781 | 94/62 |
| 7 | C | 1.47" | 32.1 | 107 | 752 | 1.579 | 38 | 89 | 781 | 93/64 |
| 8 | D | 1.47" | 32.1 | 107 | 752 | 1.575 | 38 | 85 | 781 | 96/68 |
| 9 | E | 1.47" | 32.6 | 99 | 778 | 1.576 | 38.6 | 81 | 800 | 95/69 |
| 10 | E | 1.47" | 32.1 | 107 | 752 | 1.578 | 38.1 | 84 | 783 | 94/67 |
| 11 | F | 1.47" | 32.6 | 99 | 778 | 1.576 | 38.6 | 80 | 802 | 96/68 |
| 12 | F | 1.47" | 32.1 | 107 | 752 | 1.578 | 38.1 | 85 | 785 | 96/68 |
| 13*1 | G | 1.47" | 32.6 | 99 | 778 | 1.577 | 38.4 | 87 | 787 | Not Measured |
| 14 | H | 1.47" | 32.6 | 99 | 778 | 1.583 | 38.6 | 83 | 799 | Not Measured |
| 15 | H | 1.47" | 32.1 | 107 | 752 | 1.583 | 38 | 88 | 783 | Not Measured |
| 16 | I | 1.47" | 32.6 | 99 | 778 | 1.585 | 38.7 | 86 | 795 | Not Measured |
| 17 | I | 1.47" | 32.1 | 107 | 752 | 1.583 | 38.1 | 90 | 780 | Not Measured |
| 18 | J | 1.47" | 32.6 | 99 | 778 | 1.583 | 38.6 | 89 | 788 | Not Measured |
| 19 | J | 1.47" | 32.1 | 107 | 752 | 1.581 | 38 | 96 | 767 | Not Measured |
| 20 | K | 1.47" | 32.6 | 99 | 778 | 1.582 | 38.7 | 87 | 790 | Not Measured |
| 21 | K | 1.47" | 32.1 | 107 | 752 | 1.58 | 38.2 | 93 | 776 | Not Measured |

*1> During injection molding, mantle material degraded, turning a dark brown color and giving off smoke. Some sample breakage occurred during COR testing.

What is claimed is:

1. A golf ball comprising:

a core;

at least one cover layer; and a mantle layer disposed between the core and the cover layer, the mantle layer comprising a heterogeneous mixture of at least one non-gel material and at least one gel material, wherein the non-gel material forms a continuous phase and the gel material forms a discontinuous phase.

2. The golf ball of claim 1 wherein the discontinuous phase comprises discrete particles of the gel material dispersed within the continuous phase of non-gel material.

3. The golf ball of claim 1 wherein the non-gel material forms at least two continuous layers that are separated by at least one continuous layer comprising the gel material.

4. The golf ball of claim 3 wherein the gel material has a Jar-Test Gel State Code within a range of 1 to 11.

5. The golf ball of claim 4 wherein the gel material has a Jar-Test Gel State Code in the range of 6 to 8.

6. The golf ball of claim 4 wherein the gel material has a Jar-Test Gel State Code in the range of 1 to 3.

7. The golf ball of claim 1 wherein the gel material is selected from the group consisting essentially of ground polyether block amides, ground polyester elastomer, ground rubber, latex gel, ground polyurethane, plasticized vinyl, ground plastomer, poly vinyl alcohol, cross-linked polybutadiene particles, silica gel, production RG, polystyrene gels, polyacrylic acid gel, agar, cross-linked silicone, starch gel, polysaccharide polymer gel, water gelatin gel, hydrogel and water/methyl cellulose gel, copolymer rubber based material, and viscoelastic gel.

* * * * *